United States Patent
Nguyen et al.

(10) Patent No.: US 7,575,424 B2
(45) Date of Patent: Aug. 18, 2009

(54) FLEXIBLE MOLDING DEVICE FOR MANUFACTURING A SUNKEN GROOVE IN A TIRE TREAD

(75) Inventors: Gia-Van Nguyen, Blagny (FR); Yacine Ouyahia, Bereldange (LU); Alain Emile Francois Roesgen, Asselborn (LU); Yvan Sac, Nachtmanderscheid (LU); Francis Bartholome, Libramont (BE); Gerard Louis Marie Schmit, Attert (BE); Anne-France Gabrielle Jeanne-Marie Cambron, Mersch (LU); Joel Andre Ghislain Delogne, Neufchateau (BE); Guy Jacobs, Holzthum (LU); Andre Domange, Etalle (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 73 days.

(21) Appl. No.: 11/891,874

(22) Filed: Aug. 14, 2007

(65) Prior Publication Data

US 2008/0152744 A1 Jun. 26, 2008

Related U.S. Application Data

(60) Provisional application No. 60/876,326, filed on Dec. 21, 2006.

(51) Int. Cl.
*B29C 33/44* (2006.01)
(52) U.S. Cl. .................. 425/28.1; 425/37; 425/438; 425/470
(58) Field of Classification Search ............. 425/28.1, 425/35, 37, 46, 438, 470, 472, DIG. 58

See application file for complete search history.

(56) References Cited

U.S. PATENT DOCUMENTS

| 3,687,583 | A | | 8/1972 | Felker ...................... 425/20 |
| 4,154,564 | A | | 5/1979 | French .................. 425/28 D |
| 5,075,067 | A | * | 12/1991 | Rockarts et al. ........... 425/28.1 |
| 5,095,963 | A | * | 3/1992 | Maitre ................. 152/209.18 |
| 5,843,326 | A | * | 12/1998 | Bellot ........................ 249/104 |
| 6,143,223 | A | | 11/2000 | Merino Lopez ............. 264/219 |
| 6,193,492 | B1 | | 2/2001 | Lagnier et al. ............. 425/28.1 |
| 6,408,910 | B1 | | 6/2002 | Lagnier et al. ......... 152/209.17 |
| 6,767,495 | B2 | | 7/2004 | Aperce et al. ............... 264/326 |
| 7,338,269 | B2 | * | 3/2008 | Delbet et al. ................ 425/37 |
| 2002/0134202 | A1 | * | 9/2002 | Domange et al. .......... 76/101.1 |
| 2003/0201048 | A1 | | 10/2003 | Radulescu et al. ..... 152/209.25 |
| 2006/0137793 | A1 | | 6/2006 | Nguyen et al. ......... 152/209.18 |

(Continued)

FOREIGN PATENT DOCUMENTS

DE 183380 6/1906

(Continued)

OTHER PUBLICATIONS

European Search Report completed Mar. 6, 2008.

*Primary Examiner*—James Mackey
(74) *Attorney, Agent, or Firm*—June E. Rickey

(57) ABSTRACT

A mold and molding device for forming a sunken groove in a tire is provided. The molding device includes a thin flexible wire having a desired cross-sectional shape. The wire thickness can range from about 0.5 mm to about 5 mm. The flexible wire is preferably hyperelastic. An optional molding element may be connected to the flexible wire.

3 Claims, 3 Drawing Sheets

U.S. PATENT DOCUMENTS

| | | | |
|---|---|---|---|
| 2006/0137794 A1 | 6/2006 | Nguyen et al. | 152/209.22 |
| 2006/0144491 A1 | 7/2006 | Nguyen et al. | 152/209.18 |
| 2006/0144492 A1 | 7/2006 | Nguyen et al. | 152/209.23 |

FOREIGN PATENT DOCUMENTS

| | | |
|---|---|---|
| DE | 1274799 | 8/1968 |
| EP | 0 450 251 B1 | 9/1996 |
| EP | 1260386 A2 | 11/2002 |
| EP | 1275527 A2 | 1/2003 |
| EP | 1586438 A1 | 10/2005 |
| EP | 1676695 A2 | 7/2006 |
| FR | 1476254 | 2/1967 |

* cited by examiner

FLEXIBLE MOLDING DEVICE FOR MANUFACTURING A SUNKEN GROOVE IN A TIRE TREAD

This application claims the benefit of, and incorporates by reference, U.S. Provisional Application No. 60/876,326 filed Dec. 21, 2006.

FIELD OF THE INVENTION

The present invention relates to the molding of tires, and in particular, the molding of treads for a tire.

BACKGROUND OF THE INVENTION

As a tire wears, the surface of the tread decreases due to frictional contact with the road surface. As the tire wears, the volume of the tire grooves decrease and the net to gross ratio increases. Eventually the tire will require replacement.

The tread elements in relief on a tire tread, such as the sipes, tread blocks and grooves, play a fundamental role in tire traction or adhesion to the road both in the transverse direction and in the circumferential direction. Traction is especially critical when travelling on wet or snowy roads. For wet conditions, the grooves act as evacuation channels for allowing water to pass through the tread.

It is known in the prior art to attempt to solve the degrading tread condition through the use of sunken grooves. The sunken grooves, due to a limitation in manufacturing, are generally oriented perpendicular to the shoulder region. Molding elements are typically used to form the sunken grooves, and they are often difficult to remove from the tire once the tire has been cured. To make a sunken groove, the mold elements need to be rigid enough to penetrate the uncured or green rubber tread, but flexible enough to be extracted from the cured tire without damaging the tire. Another requirement is that the sunken groove needs to be large and thick enough to be efficient, which leads to a molding element so stiff that its extraction would damage the tire tread or the element itself would fail by a fatigue fracture. Thus it is desired to have a method and apparatus of forming sunk grooves that does not have the disadvantages described above.

SUMMARY OF THE INVENTION

A molding element for forming a sunken groove in a tire is provided. The molding device comprises a thin flexible wire having a desired cross-sectional shape. The wire thickness can range from about 0.5 mm to about 5 mm. The flexible wire is made from a hyperelastic material or shape memory alloy.

BRIEF DESCRIPTION OF THE DRAWINGS

The invention will be described by way of example and with reference to the accompanying drawings in which.

DETAILED DESCRIPTION OF THE INVENTION

Figure 1:
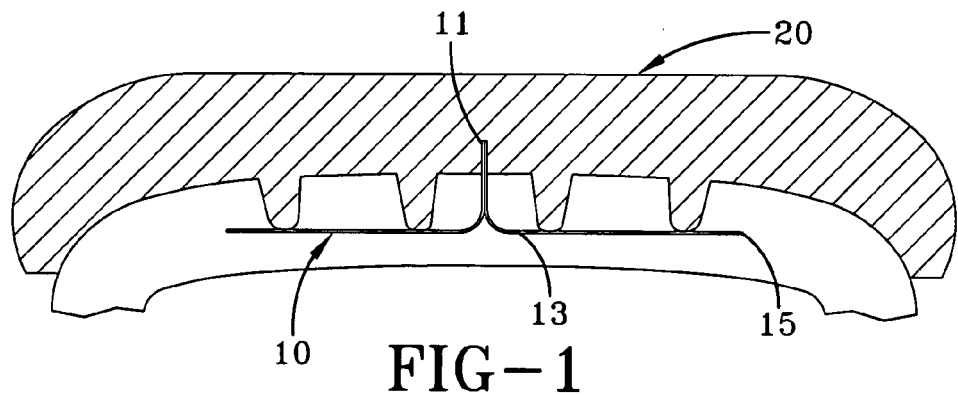
FIG. 1 is a cross-sectional view of a molding device installed in a tire mold.

FIG. 1 illustrates a first embodiment of a molding device 10, suitable for molding sunken grooves or sipes in a tire tread. A sunken groove or sipe is a void area disposed underneath the new tread surface of a tire that is not exposed when the tire is new, and that as the tire tread is worn during service, the sunken groove or sipe is exposed.

The molding device 10 may be comprised of a thin flexible wire 13 having a distal end 11, a mid-section 14 and a second end 15. The wire thickness can range from about 0.5 mm to about 5 mm. Two or more molding devices may be utilized, as shown in FIG. 2, wherein the distal ends 11 are intertwined. The distal end 11 may be mounted to an interior portion of a tire mold, as described in more detail, below. The positioning of the blade can be radial or oriented in any other direction as the flexibility of the device enables the demolding in any direction.

Figure 2A:
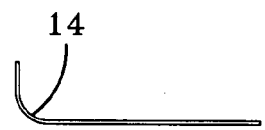
FIGS. 2A-2E illustrate exemplary cross-sectional views of the molding device of FIG. 1.
Figure 2B:
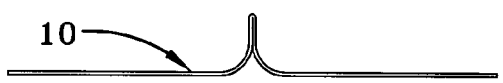
Figure 2C:
Figure 2D:
Figure 2E:

The mid-section 14 of the flexible wire may comprise a radiused bend as shown in FIG. 2A. The second end may also comprise a radiused bend as shown in FIGS. 2C and 2D resulting in a U shaped molding device. The U-shaped molding device may also be partially closed as shown in FIG. 2E.

Figure 3:
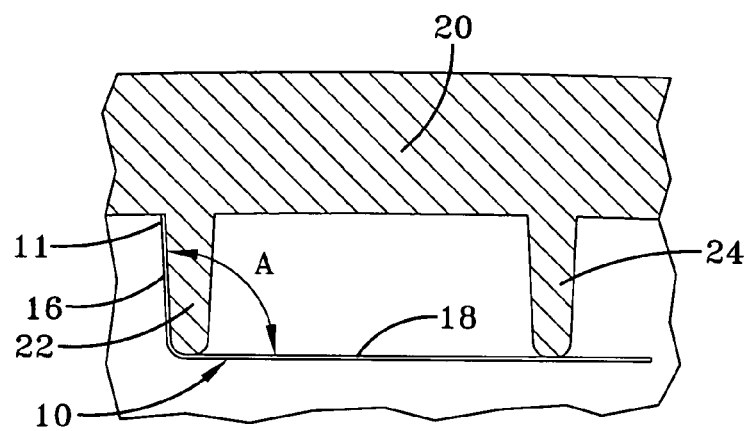
FIG. 3 is a cross-sectional view of a second embodiment of the molding device installed in a tire mold.

FIG. 3 is a second embodiment of the molding device 10 installed in a mold having relief elements 22, 24. The distal end of the molding device 10 is installed adjacent a relief element 22. A first portion 16 of the molding device 10 abuts with the relief element 22 for structural support. A second portion 18 of the molding device extends axially outward in engagement with a lower end of a second adjacent relief element 24. The angle A defined by lower portion 18 with respect to the upper portion 16 may vary.

Figure 4:
FIG. 4 is a cross-sectional view of a third embodiment of the molding device installed in a tire mold.

FIG. 4 is a third embodiment of the molding device 10 having a concave upwards U shaped geometry. The distal end 11 of the molding device 10 is mounted in the sidewall of the tire mold such that second end is oriented to extend upwardly. This enables a different bending stiffness behavior from one side of the molding device to the other allowing the element to have high rigidity during molding and low rigidity during extraction.

Figure 5:
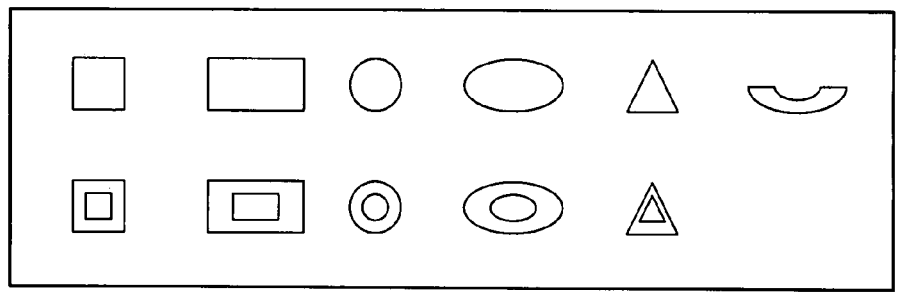
FIG. 5 illustrates exemplary cross-sections of the molding device.
Figure 9:
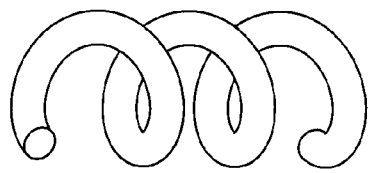
Figure 11:
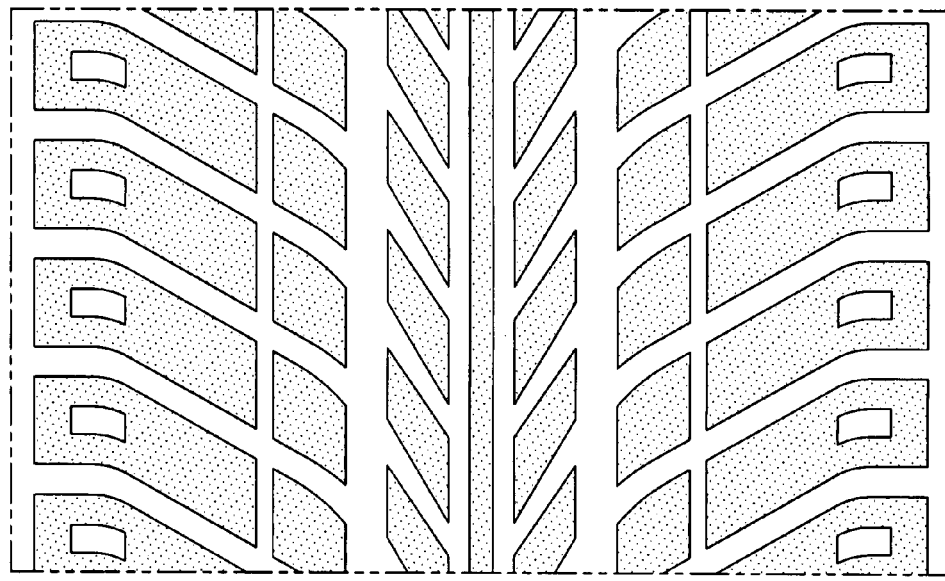
FIG. 11 is the section of the tire tread of FIG. 10 shown in the worn condition.
Figure 10:
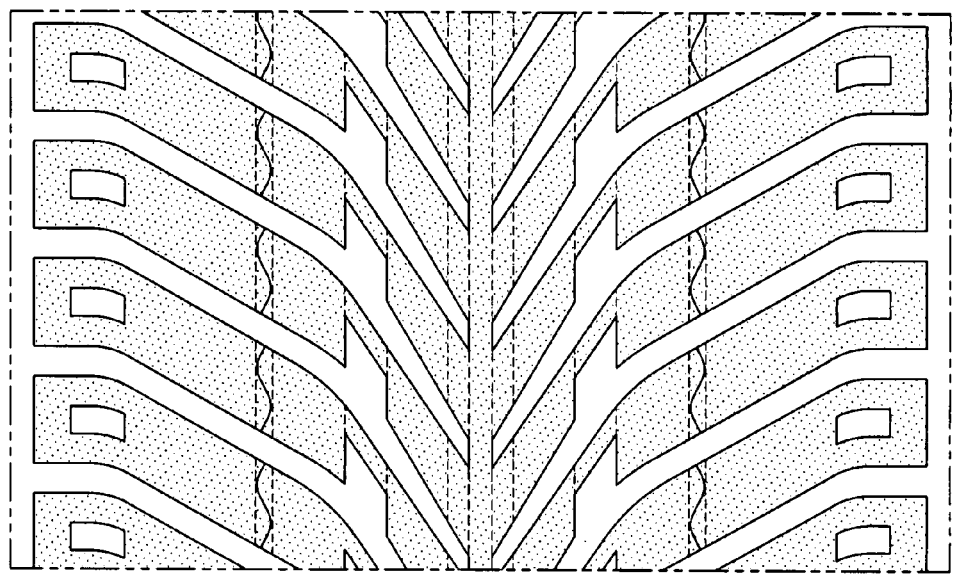
FIG. 10 is a section of an exemplary footprint of a new (unworn) tire tread shown with the sunken grooves in phantom.

Examples of cross-sections of the molding device are shown in FIG. 5, wherein the cross-sectional shape can be sized as desired and configured to have the desired shape such as round, square, rectangular, triangular, and elliptical. The dimensions of the blade will be defined according to the application requirement. The cross-sectional shape may vary. For example, the shape may be a helix as shown in FIG. 9.

The molding device preferably has a curvature in the surface parallel to the tire tread outside surface or in a plane perpendicular to the tire tread outside surface. The bottom of the molding element or assembly disposed up to a maximum of 140% of the non-skid dimension but preferably between 80% to 120% of this value during the vulcanization phase.

Figure 6A:
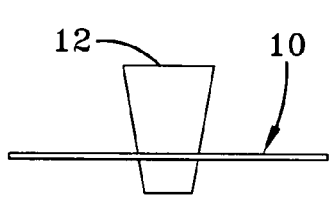
FIGS. 6A-6D illustrate additional embodiments of the molding device.
Figure 6B:
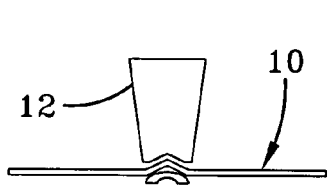
Figure 6C:
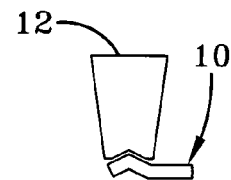
Figure 6D:
Figure 7:
FIGS. 7-9 illustrate additional embodiments of the molding device.
Figure 8:
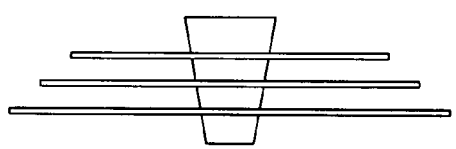

As shown in FIGS. 6A-6C, the molding device 10 may further optionally comprise a molding element 12. The molding element 12 is preferably made from a rigid material. The molding element 12 may be any desired size, but for example, may be about 3-15 mm long, about 1-4 mm tall and about 5-8 mm deep. The molding element 12 may have a trapezoidal cross-sectional shape as shown in FIG. 6A, or as shown in FIG. 6b or any other desired cross-sectional shape. FIG. 8 illustrates yet another example of a molding element 12 having three molding devices 10 connected thereto.

The flexible wire 13 may be made of a flexible metal or material. It is preferred that the material be highly elastic, hyperelastic or superelastic, examples of which include, but are not limited to, shape memory alloys, Nickel-Titanium alloys, CuZnAl, CuAlNi and CuAlBe. It is preferred that the wire material have an elastic limit greater than or equal to about 5% elongation, and more preferably greater than or equal to 10%. The wire may have any desired cross-sectional shape.

FIG. 4 illustrates one example of the molding device shown in use with an upper portion of a tire mold 30. The molding device 10 is embedded in the green tire tread prior to cure. The molding device 10 may be mounted to in any desired orientation to the tire mold, so that for example, the sunken groove may be oriented circumferentially, axially or any other desired configuration. The molding device may be mounted in the segments of the mold corresponding to the crown portion of the tread or located in the portions of the mold corresponding to the sidewalls. The tire mold 30 has an inner surface 31 having relief elements 32 for forming a respective groove 34 in a tire tread.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding device for forming a sunken groove in a tire, the molding device comprising a first and second flexible wire, wherein each wire has a first end and a second end, wherein the first ends are joined together and the second ends are positioned to extend in opposite directions from each other wherein the first and second wires are formed from a material having an elastic limit greater than or equal to 5% elongation.

2. The molding device of claim 1 wherein the wire is formed from a superelastic alloy.

3. The molding device of claim 1 wherein the wire is formed from a material having an elastic limit greater than or equal to 10% elongation.

\* \* \* \* \*